(12) United States Patent
Chang et al.

(10) Patent No.: US 9,772,433 B2
(45) Date of Patent: Sep. 26, 2017

(54) OPTICAL LENS AND OPTICAL LENS MODULE

(71) Applicant: Genius Electronic Optical Co., Ltd., Taichung (TW)

(72) Inventors: Chung-Chih Chang, Taichung (TW); Xiaomei Yu, Fujian (CN); Juling Tang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 14 days.

(21) Appl. No.: 14/837,463

(22) Filed: Aug. 27, 2015

(65) Prior Publication Data

US 2016/0349420 A1 Dec. 1, 2016

(30) Foreign Application Priority Data

May 26, 2015 (CN) .......................... 2015 1 0273767

(51) Int. Cl.
| | | |
|---|---|---|
| *G02B 5/20* | (2006.01) | |
| *H04N 5/225* | (2006.01) | |
| *G02B 7/02* | (2006.01) | |
| *G02B 1/04* | (2006.01) | |
| *G02B 1/11* | (2015.01) | |
| *G02B 5/28* | (2006.01) | |

(52) U.S. Cl.
CPC ............ *G02B 5/206* (2013.01); *G02B 1/041* (2013.01); *G02B 7/021* (2013.01); *H04N 5/2254* (2013.01); *G02B 1/11* (2013.01); *G02B 5/208* (2013.01); *G02B 5/282* (2013.01)

(58) Field of Classification Search
CPC . G02B 1/04; G02B 3/00; G02B 7/021; G02B 5/208; G02B 5/223; G02B 5/22; G02B 13/14; G02B 2207/113; G09B 23/0066; G09B 67/0033; G09B 67/0034; G09B 57/007; H04M 1/0264
USPC .......................................... 348/335
See application file for complete search history.

(56) References Cited

U.S. PATENT DOCUMENTS

| 8,623,775 | B2 * | 1/2014 | Hung | ........................ | G02B 5/22 |
| | | | | | 252/587 |
| 8,860,869 | B2 * | 10/2014 | Pei | .......................... | G02B 1/02 |
| | | | | | 348/342 |
| 2011/0038065 | A1 * | 2/2011 | Miyawaki | .............. | G02B 7/021 |
| | | | | | 359/819 |
| 2012/0068292 | A1 * | 3/2012 | Ikeda | ................... | G02B 13/006 |
| | | | | | 257/432 |
| 2013/0155495 | A1 * | 6/2013 | Wang | .................... | G02B 5/208 |
| | | | | | 359/356 |
| 2013/0222894 | A1 * | 8/2013 | Hung | .................... | G02B 5/208 |
| | | | | | 359/356 |
| 2014/0118849 | A1 * | 5/2014 | Mori | ....................... | G02B 9/04 |
| | | | | | 359/715 |
| 2014/0357781 | A1 * | 12/2014 | Yang | ..................... | C08L 83/10 |
| | | | | | 524/537 |
| 2015/0080515 | A1 * | 3/2015 | Daga | ....................... | C08L 69/00 |
| | | | | | 524/451 |

(Continued)

*Primary Examiner* — Pritham Prabhakher
(74) *Attorney, Agent, or Firm* — Jianq Chyun IP Office (57) ABSTRACT

An optical lens includes a plastic lens body and a plurality of light-absorbing particles. The light-absorbing particles are dispersed in the plastic lens body, are present in an amount ranging from 0.01 wt % to 0.05 wt % based on the total weight of the optical lens, and are capable of absorbing infrared having a wavelength greater than 1100 nm.

16 Claims, 9 Drawing Sheets

(56) References Cited

U.S. PATENT DOCUMENTS

2015/0259509 A1* 9/2015 Kitahara .............. C08G 18/10
428/447

* cited by examiner

OPTICAL LENS AND OPTICAL LENS MODULE

CROSS-REFERENCE TO RELATED APPLICATION

This application claims priority of Chinese Patent Application No. 201510273767.6, filed on May 26, 2015.

FIELD

The disclosure relates to an optical lens and an optical lens module, more particularly to an optical lens and an optical lens module that are capable of reducing transmission of infrared therethrough.

BACKGROUND

An image captured by a camera often appears with purple fringing owing to the sensing of infrared by a sensor in an optical lens module of the camera. Generally, an infrared cut-off filter can effectively block infrared having a wavelength ranging from 700 nm to 1100 nm. However, light leakage may happen for infrared having a wavelength greater than 1100 nm. Moreover, with larger incident angle, the wavelength of the incident infrared may be reduced owing to blue shift effect, so that the purple fringing problem becomes worse.

SUMMARY

Therefore, an object of the present disclosure is to provide an optical lens and an optical lens module that can alleviate the aforementioned drawback associated with the conventional optical lens module.

According to a first aspect of the present disclosure, an optical lens includes a plastic lens body and a plurality of light-absorbing particles. The light-absorbing particles are disposed in the plastic lens body, are present in an amount ranging from 0.01 wt % to 0.05 wt % based on the total weight of the optical lens, and are capable of absorbing infrared having a wavelength greater than 1100 nm.

According to a second aspect of the present disclosure, an optical lens module includes a lens barrel and a plurality of lenses that are disposed in the lens barrel. At least one of the lenses is the aforesaid optical lens.

BRIEF DESCRIPTION OF THE DRAWINGS

Other features and advantages of the present disclosure will become apparent in the following detailed description of the embodiment and variations with reference to the accompanying drawings, of which.

DETAILED DESCRIPTION

Before the disclosure is described in further detail with reference to the accompanying embodiment and variations, it should be noted herein that like elements are denoted by the same reference numerals throughout the disclosure.

Figure 1:
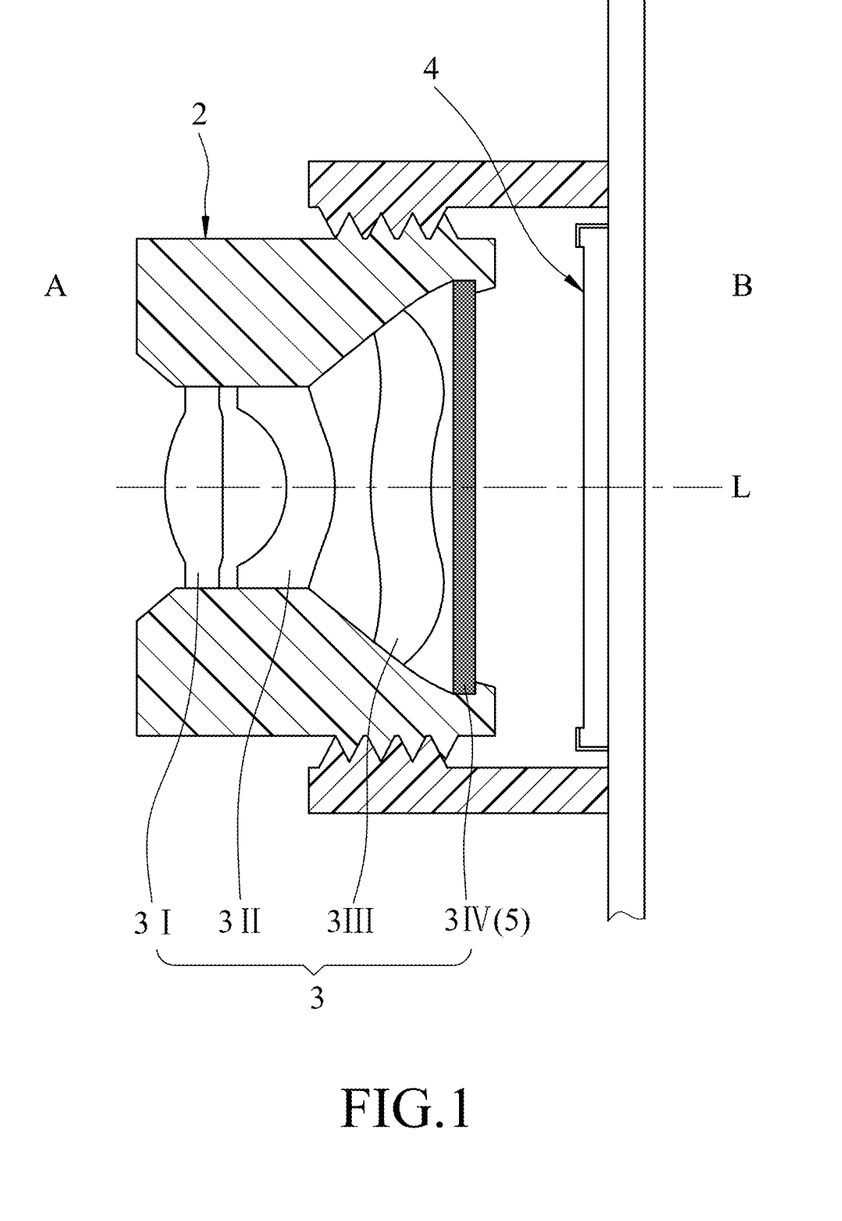
FIG. 1 is a fragmentary partly cross-sectional view of an exemplary embodiment of an optical lens module according to the present disclosure, the optical lens module including an optical lens.
Figure 2:
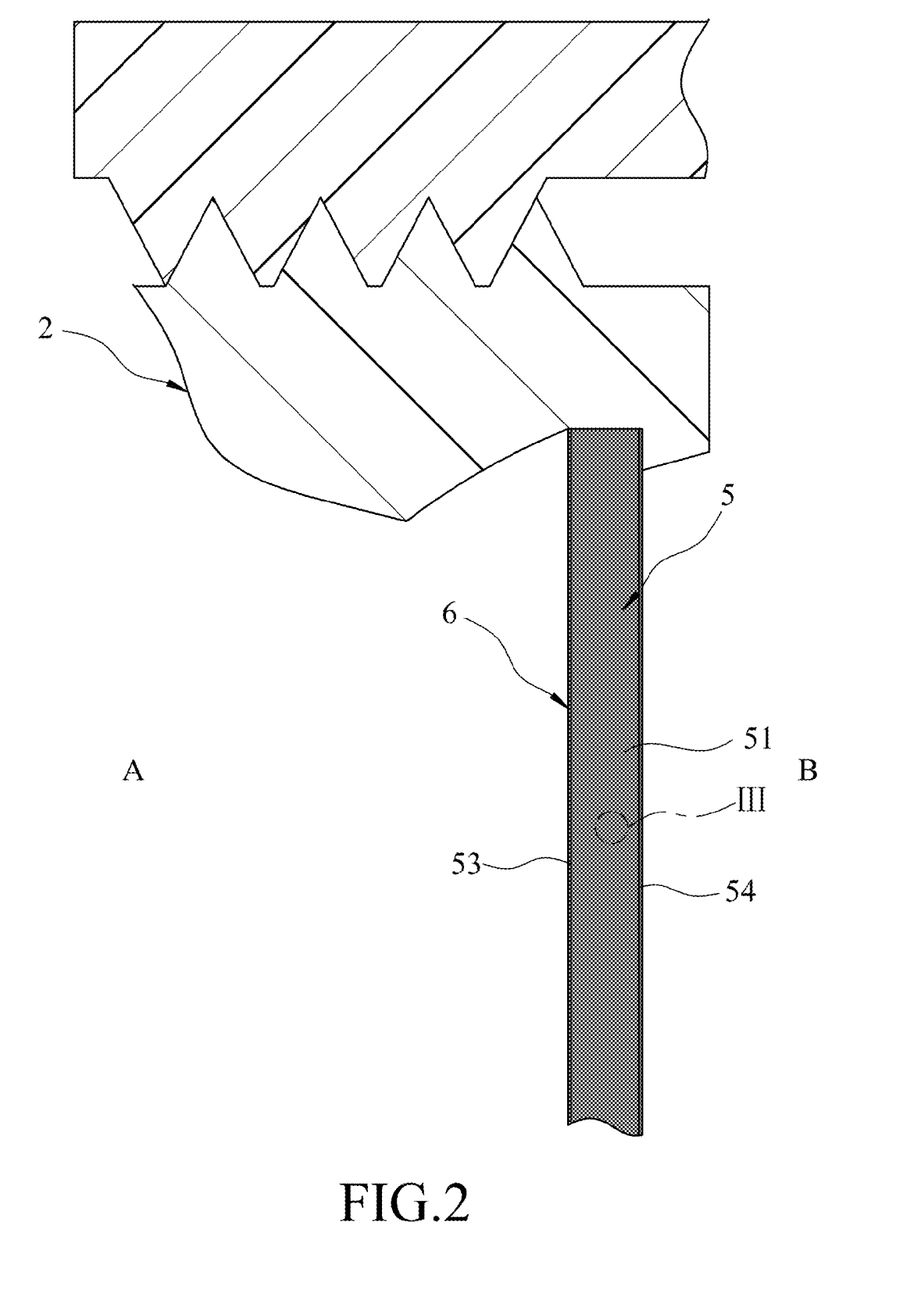
FIG. 2 is a close-up view of FIG. 1.

Referring to FIGS. 1 and 2, an exemplary embodiment of an optical lens module according to the present disclosure includes a lens barrel 2, four lenses 3 that are disposed in lens barrel 2, and a sensor 4.

The sensor 4 is mounted on the lens barrel 2 for sensing an image captured by the optical lens module. The lenses 3 are arranged along an optical axis (L) from an object side (A) to an image side (B) of the optical lens module, and are accordingly marked as 3I, 3II, 3III and 3IV. The number of the lenses 3 is not limited to four, and may be changed according to practical requirements.

Figure 3:
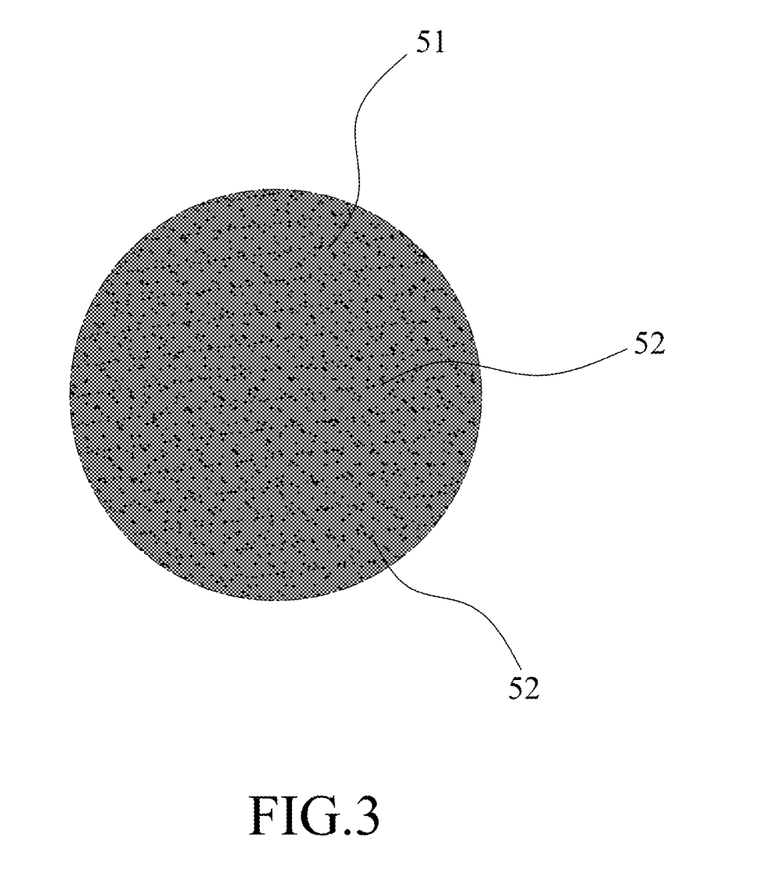
FIG. 3 is a schematic view taken from circle III of FIG. 2, illustrating a plastic lens body and a plurality of light-absorbing particles of the optical lens.
Figure 5:
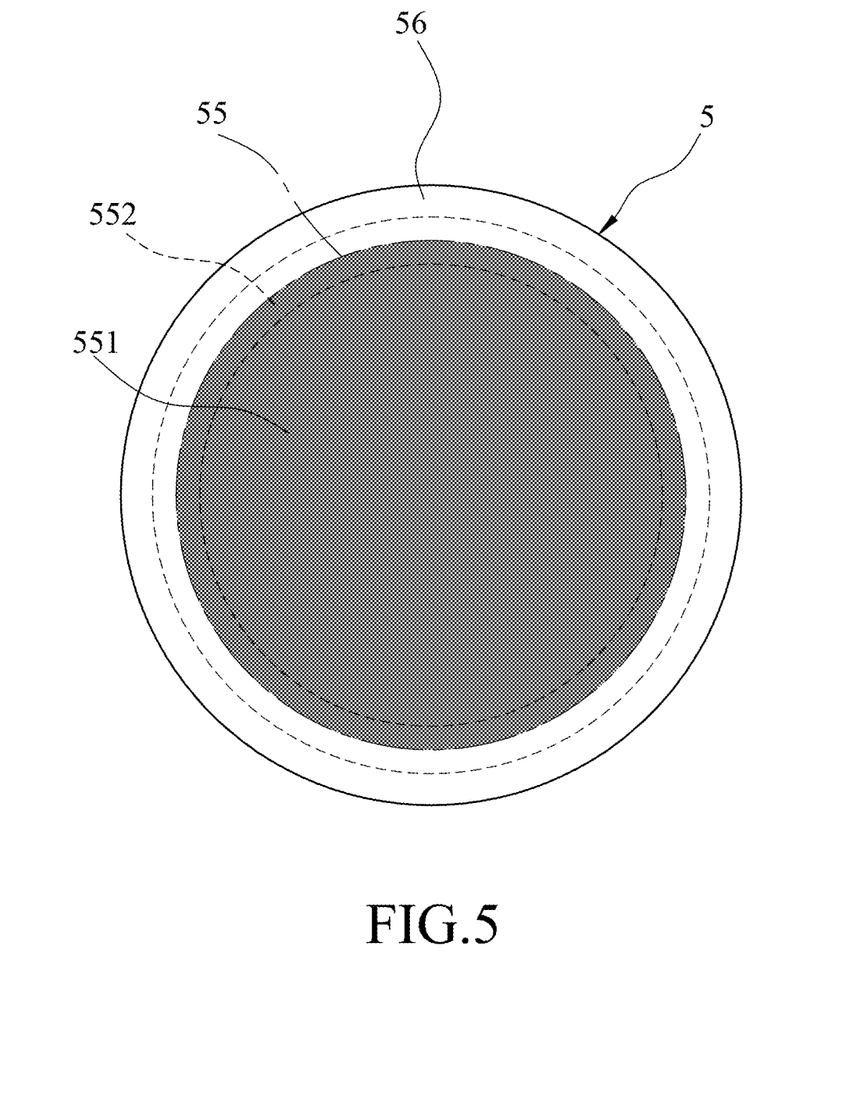
FIG. 5 is a schematic view of the optical lens, showing the light-absorbing particles dispersed in an optically effective portion of the plastic lens body.

At least one of the lenses 3 is an optical lens 5 that includes a plastic lens body 51 and a plurality of light-absorbing particles 52 (see FIGS. 2, 3 and 5). In this embodiment, the lens 3IV located closest to the image side (B) of the optical lens module is the aforesaid optical lens 5. The types of the lenses 3I, 3II and 3III are selected according to practical requirements and are not particularly limited.

Referring back to FIGS. 2, 3 and 5, the plastic lens body 51 has an object surface 53 close to the object side (A), an image surface 54 close to the image side (B), an optically effective portion 55 and an assembling portion 56 surrounding the optically effective portion 55. The light-absorbing particles 52 are dispersed in the plastic lens body 51, are present in an amount ranging from 0.01 wt % to 0.05 wt % based on the total weight of the optical lens, and are capable of absorbing infrared having a wavelength greater than 1100 nm, thereby reducing transmittance for infrared having a wavelength greater than 1100 nm. The light-absorbing particles 52 may be made of a powder material containing metal, such as IRA868.

The plastic lens body 51 may be made from plastic particles by injection molding. The light-absorbing particles 52 may be mixed with a material of the plastic particles during formation of the plastic particles. The light-absorbing particles 52 may also be mixed with the plastic particles before injection molding. The method of incorporating the light-absorbing particles 52 with the plastic particles may vary according to practical requirements. The plastic particles may be made of transparent plastic materials, such as cyclic olefin-based resin (e.g., Zeonex E48R and APEL Series), aromatic polyester resin (e.g., OKP Series), epoxy resin (e.g., EP Series) and polycarbonate resin (e.g., SP Series).

In this embodiment, Zeonex E48R is selected as the plastic material. During formation of the optical lens 5, 99.99 wt % to 99.95 wt % of Zeonex E48R particles and 0.01 wt % to 0.05 wt % of the light-absorbing particles 52 (the total weight percentages of Zeonex E48R particles and the light-absorbing particles 52 being 100) are evenly mixed and are injection molded into the optical lens 5. The plastic lens body 51 of the optical lens 5 is a flat lens having an outside diameter of 10 mm and a thickness of 1 mm. The optical lens 5 may further include an infrared reflective coating 6 formed on the plastic lens body 51. The method of coating the infrared reflective coating 6 on the plastic lens body 51 is well known in the art and will not be described for the sake of brevity. The infrared reflective coating 6 is capable of blocking infrared.

Figure 4:
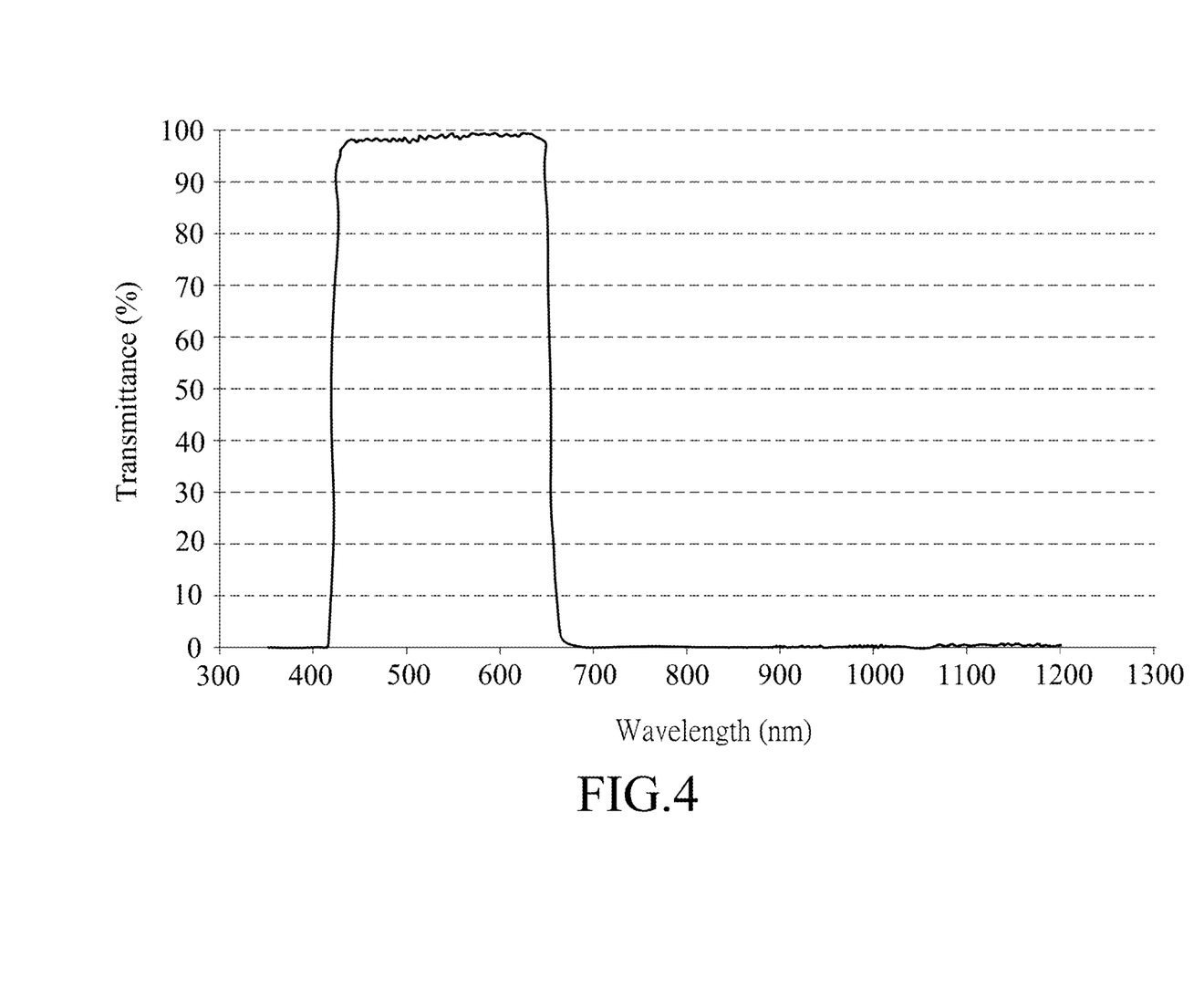
FIG. 4 is a diagram showing transmittance of the optical lens with respect to the light wavelength.

As shown in FIG. 4, the optical lens 5 is capable of effectively blocking infrared having a wavelength ranging from 700 nm to 1100 nm. Infrared having a wavelength larger than 1100 nm is absorbed by the light-absorbing particles 52. Therefore, light transmittance of infrared having a wavelength greater than 700 nm is close to zero. Conventional light-absorbing particles do not contain metal. The light-absorbing particles 52 of the exemplary embodiment contains metal, are present in an amount ranging from 0.01 wt % to 0.05 wt %, and are evenly distributed in the plastic lens body 51, so that light leakage of the infrared having a wavelength greater than 1100 nm can be effectively alleviated.

The infrared reflective coating 6 of the optical lens 5 enables omission of a IR cut lens, thereby reducing the manufacturing cost and simplifying the manufacturing process. Note that the infrared reflective coating 6 may be omitted according to practical requirements.

Distribution of the light-absorbing particles 52 in the plastic lens body 51 may be controlled by adjusting the ratio of the light-absorbing particles 52 and the plastic material of the plastic lens body 51 or the conditions of the manufacturing process, such as mold arrangements. For example, the light-absorbing particles 52 may be controlled to be distributed near the object surface 53 or the image surface 54 of the plastic lens body 51.

Figure 6:
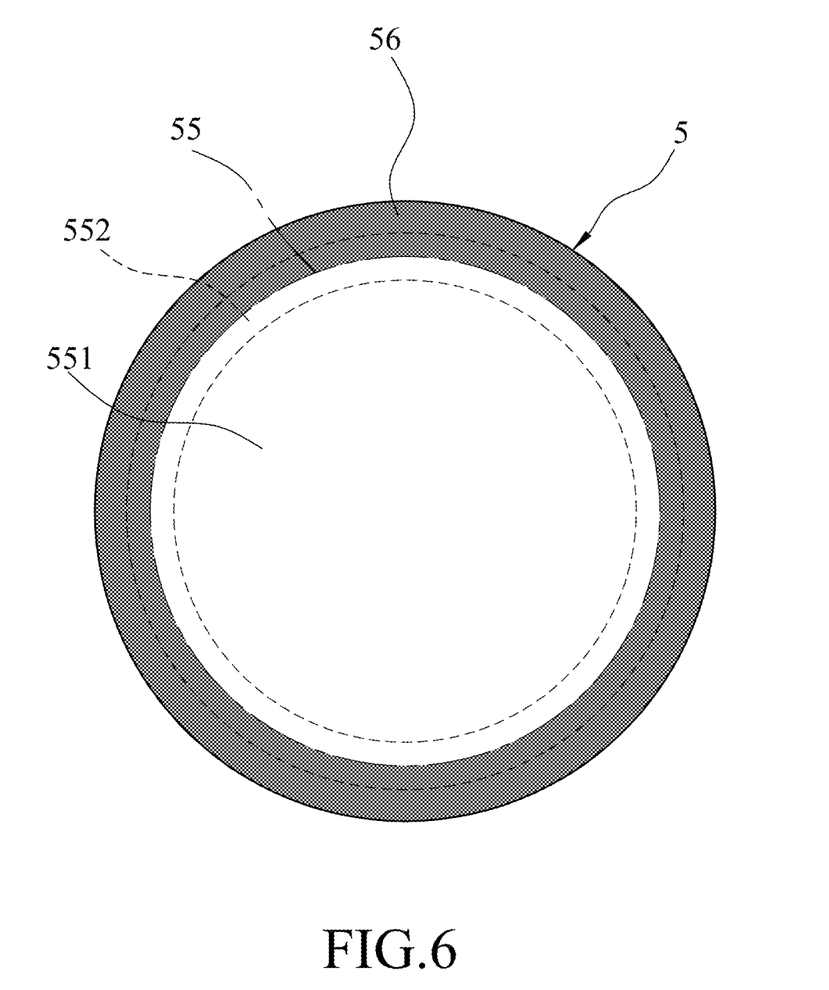
FIG. 6 is a schematic view similar to that of FIG. 5, but showing the light-absorbing particles dispersed in an assembling portion of the plastic lens body.

Referring to FIGS. 5 and 6, the light-absorbing particles 52 may be dispersed in the optically effective portion 55 (see FIG. 5) or the assembling portion 56 (see FIG. 6) of the plastic lens body 51. As shown in FIG. 5, the light-absorbing particles 52 may be dispersed in a central region 551 or a surrounding region 552 of the optically effective portion 55 that surrounds the central region 551. Note that the position of the light-absorbing particles 52 may be changed according to practical requirements and should not be considered limited by the examples disclosed herein. By having the light-absorbing particles 52 controlled to be dispersed in the optically effective portion 55, the strength of the assembling portion 56 would not be adversely affected by the light-absorbing particles 52. As shown in FIG. 6, when the light-absorbing particles 52 are dispersed in the assembling portion 56, the light-absorbing particles 52 may be made of a material that is capable of absorbing visual light, so that light refracted to the assembling portion 56 can be absorbed by the light-absorbing particles 52. With such disposition, light transmittance at the optically effective portion 55 may be prevented from being impaired.

Note that, with the optical lens 5 of this embodiment, infrared having a wavelength greater than 1100 nm will be blocked from reaching the sensor 4. Since the purple fringing problem can be alleviated by simply replacing the conventional lens with the optical lens 5 of this disclosure, and since extra filter elements are not required in this embodiment, the manufacturing procedure and apparatuses required for making the optical lens module need not be excessively altered. Therefore, the manufacturing cost would not be drastically increased as compared with that of the conventional optical lens.

Figure 7:
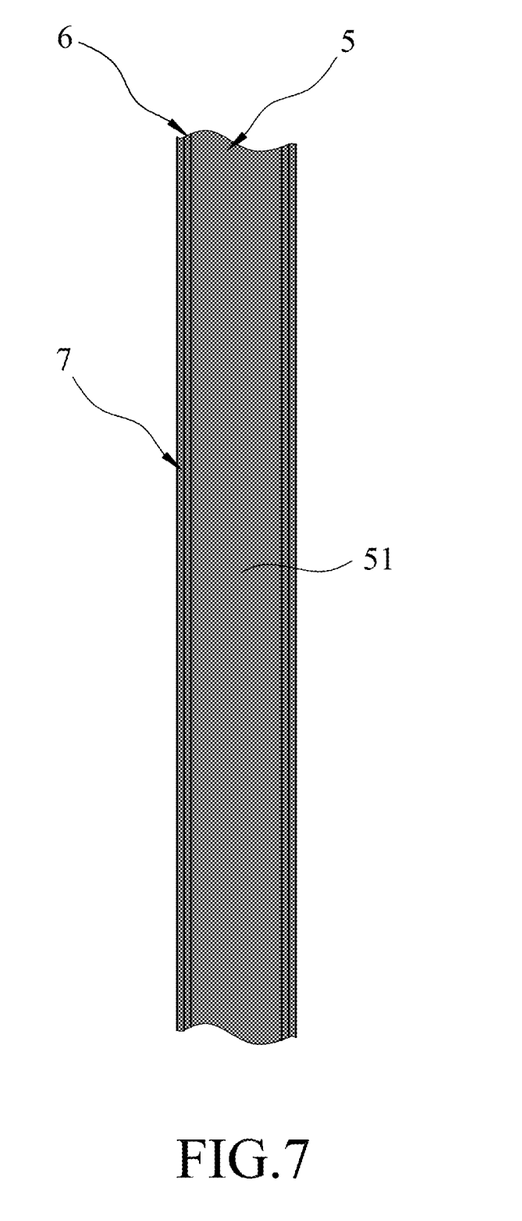
FIG. 7 is a fragmentary side view of the optical lens.

Referring to FIG. 7, in this embodiment, the optical lens 5 may further include an anti-reflective coating 7 formed on the plastic lens body 51 for enhancing transmittance of visible light having a wavelength ranging from 400 nm to 700 nm. The optical lens of the optical lens module may include both or either one of the infrared reflective coating 6 and the anti-reflective coating 7. It should be noted that the anti-reflective coating 7 is capable of enhancing light transmittance of the optical lens 5, but the infrared reflective coating 6 is not of the essence of the present disclosure.

Figure 8:
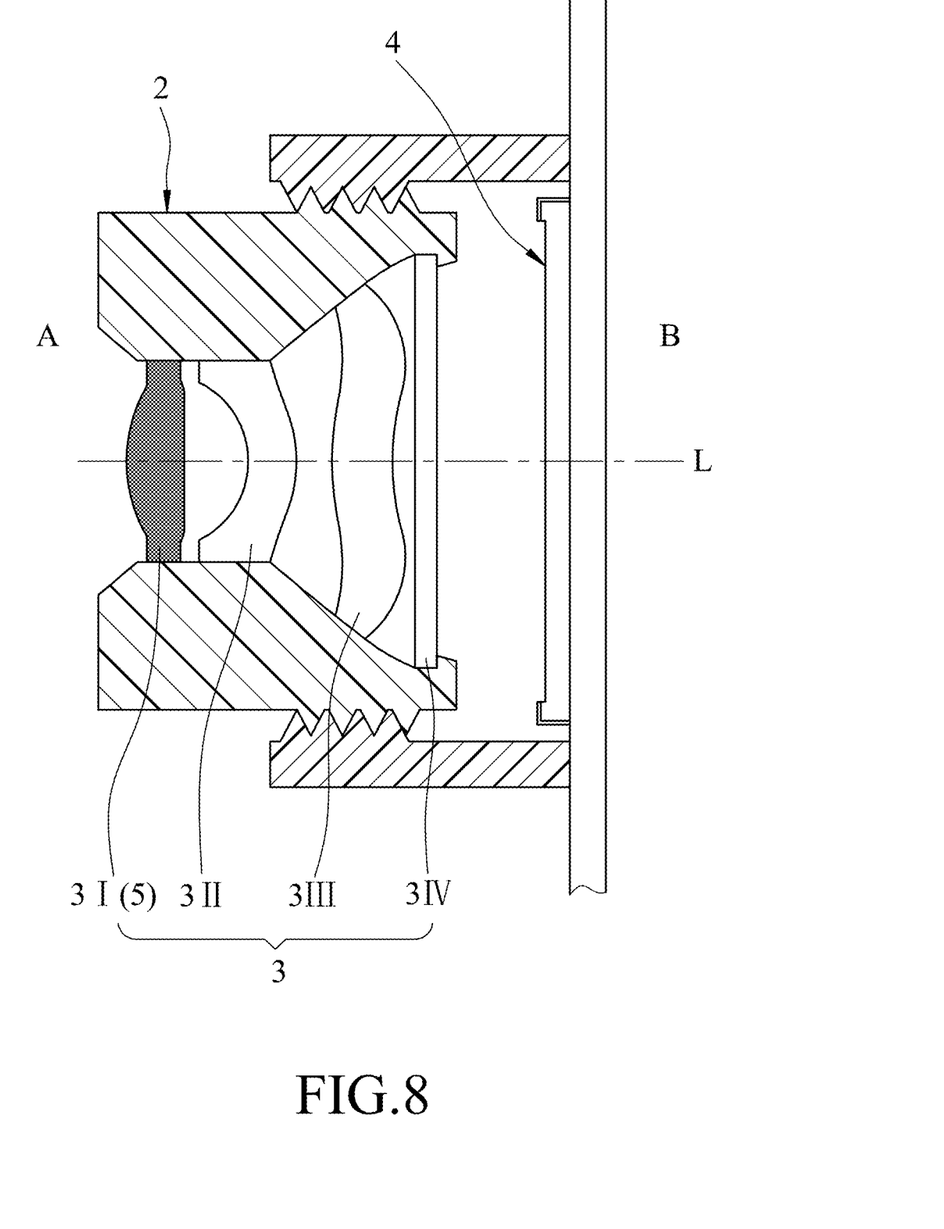
FIG. 8 is a fragmentary partly cross-sectional view of a variation of the exemplary embodiment.

Referring to FIG. 8, in a variation of the embodiment, the lens 31 located closest to the object side (A) of the optical lens module is the optical lens 5 of this disclosure. Infrared having a wavelength greater than 1100 nm will be also blocked from reaching the sensor 4.

Figure 9:
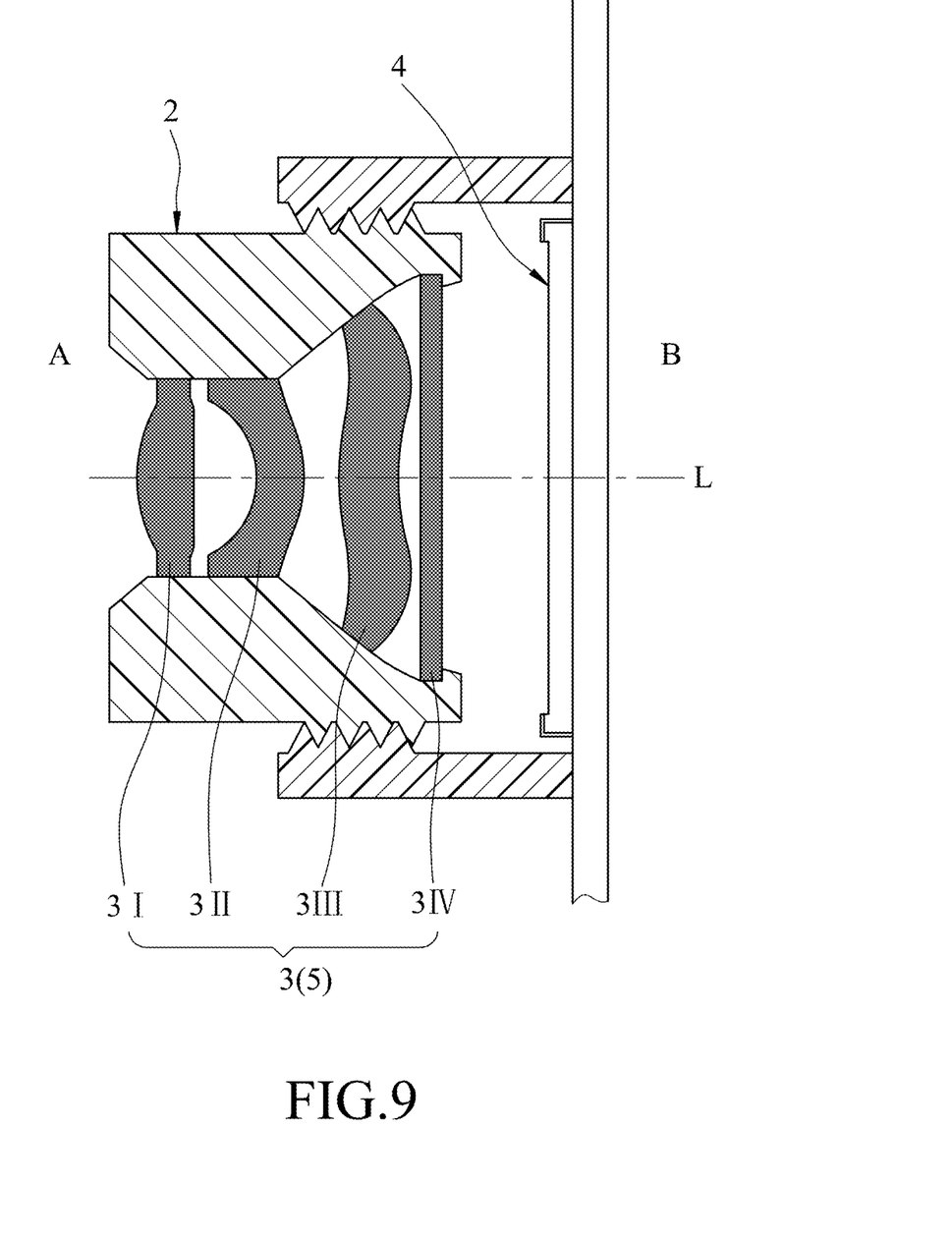
FIG. 9 is a fragmentary partly cross-sectional view of another variation of the exemplary embodiment.

Referring to FIG. 9, in another variation of the embodiment, each of the lenses 3I, 3II, 3III and 3IV is configured to be the optical lens 5 of this disclosure, thereby achieving better blockage of infrared.

To sum up, with the light-absorbing particles 52 dispersed in the plastic lens body 51 of the optical lens 5, infrared having a wavelength greater than 1100 nm can be effectively blocked.

While the disclosure has been described in connection with what are considered the exemplary embodiment and variations, it is understood that this disclosure is not limited to the disclosed embodiment and variations but is intended to cover various arrangements included within the spirit and scope of the broadest interpretation so as to encompass all such modifications and equivalent arrangements.

What is claimed is:

1. An optical lens comprising:
   a plastic lens body; and
   a plurality of light-absorbing particles that are dispersed in said plastic lens body, that are present in an amount ranging from 0.01 wt % to 0.05 wt % based on the total weight of said optical lens, and that are capable of absorbing infrared having a wavelength greater than 1100 nm,
   wherein said light-absorbing particles are made of a powder material containing metal.

2. The optical lens as claimed in claim 1, wherein said light-absorbing particles are evenly dispersed in said plastic lens body.

3. The optical lens as claimed in claim 1, further comprising an anti-reflective coating formed on said plastic lens body.

4. The optical lens as claimed in claim 1, further comprising an infrared reflective coating formed on said plastic lens body.

5. The optical lens as claimed in claim 1, wherein said plastic lens body has an optically effective portion and an assembling portion surrounding said optically effective portion, said light-absorbing particles being dispersed in said optically effective portion.

6. The optical lens as claimed in claim 1, wherein said plastic lens body has an optically effective portion and an assembling portion surrounding said optically effective portion, said light-absorbing particles being dispersed in said assembling portion.

7. The optical lens as claimed in claim 1, wherein said plastic lens body being made from a material selected from the group consisting of cyclic olefin-based resin, aromatic polyester resin, epoxy resin and polycarbonate resin.

8. An optical lens module comprising:
   a lens barrel; and
   a plurality of lenses that are disposed in said lens barrel, at least one of said lenses being said optical lens of claim 1.

9. The optical lens module as claimed in claim 8, wherein said optical lens further includes an anti-reflective coating formed on said plastic lens body.

10. The optical lens module as claimed in claim 9, further comprising a sensor mounted on said lens barrel for sensing an image captured by said optical lens module.

11. The optical lens module as claimed in claim 8, wherein said plastic lens body of said optical lens is a flat lens, said light-absorbing particles being evenly dispersed in said plastic lens body.

12. The optical lens module as claimed in claim 11, wherein said optical lens further comprises an infrared reflective coating formed on said plastic lens body.

13. The optical lens module as claimed in claim 8, wherein said lenses are arranged along an optical axis from an object side to an image side of said optical lens module, said optical lens being located closest to said image side of said optical lens module.

14. The optical lens module as claimed in claim 8, wherein said lenses are arranged along an optical axis from an object side to an image side of said optical lens module, said optical lens being located closest to said object side of said optical lens module.

15. The optical lens module as claimed in claim 8, wherein more than one of said lenses are each said optical lens of claim 1.

16. The optical lens module as claimed in claim 8, wherein said plastic lens body being made of a material selected from the group consisting of cyclic olefin-based resin, aromatic polyester resin.

* * * * *